Oct. 13, 1931.  J. M. LE GRAND  1,827,530
METHOD AND APPARATUS FOR PRODUCING ARTIFICIAL CLIMATES
Filed Dec. 27, 1927   2 Sheets-Sheet 1
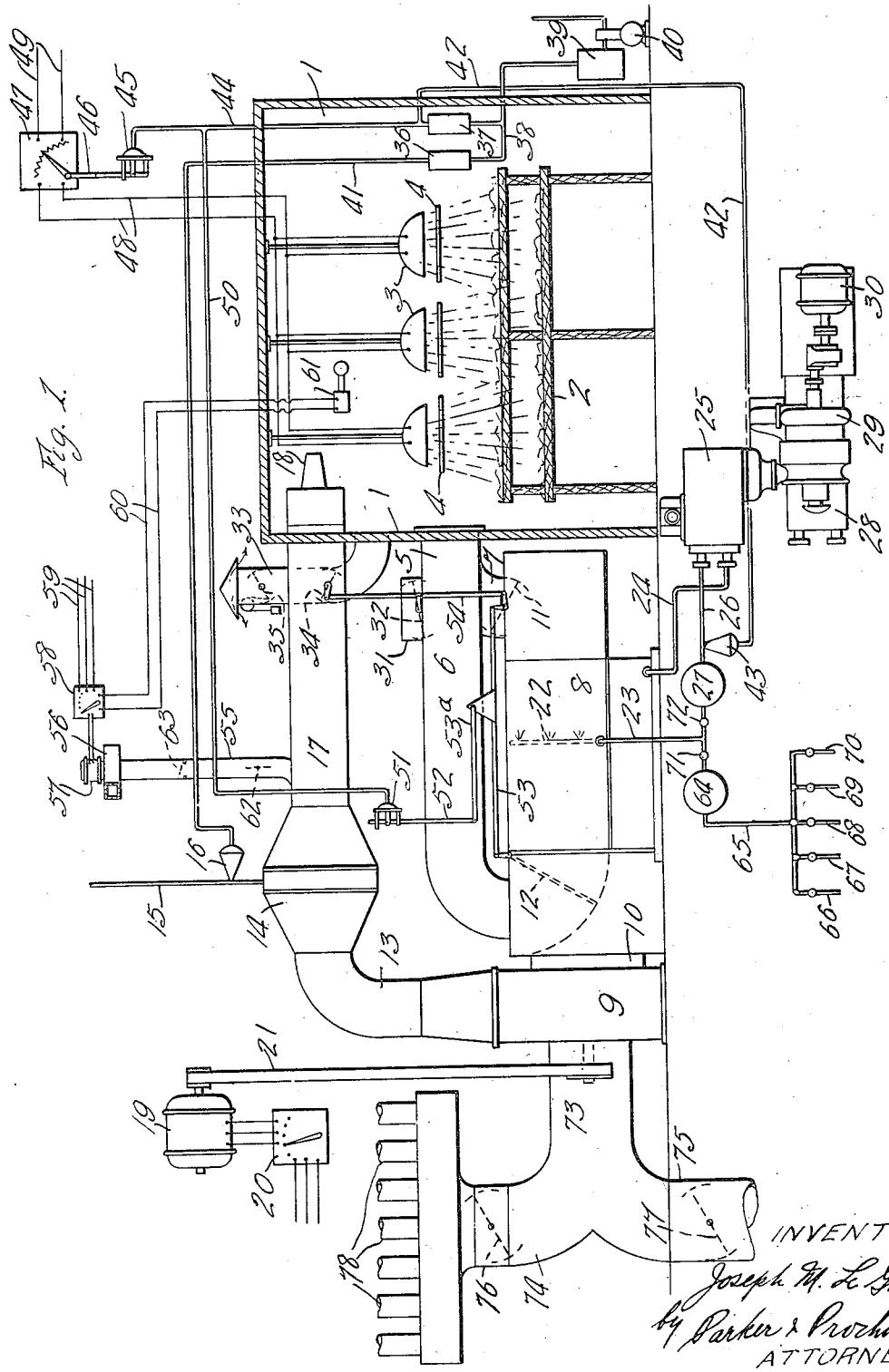
INVENTOR
Joseph M. Le Grand
by Parker & Prochnow
ATTORNEYS

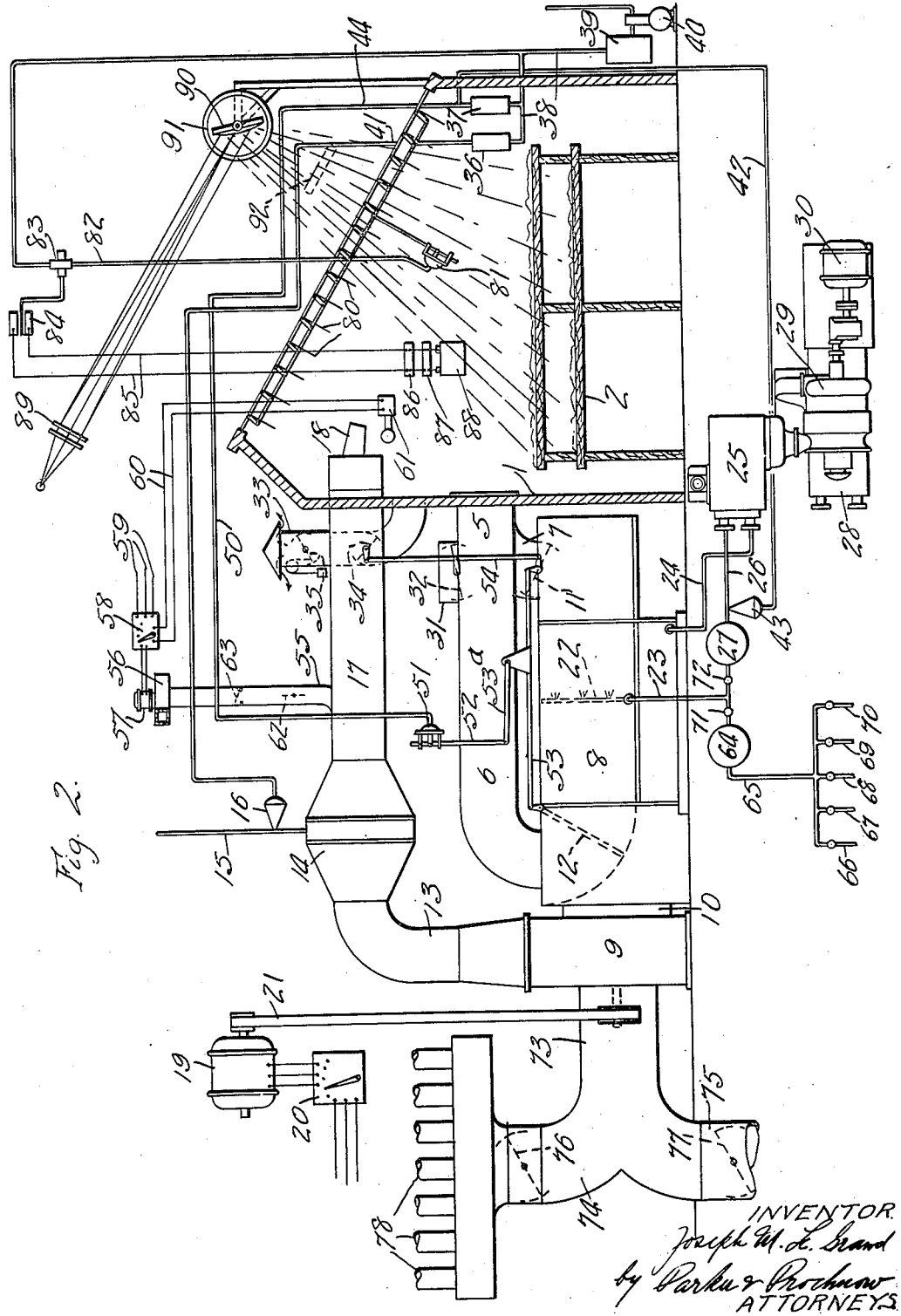

Patented Oct. 13, 1931

1,827,530

UNITED STATES PATENT OFFICE

JOSEPH M. LE GRAND, OF NEWARK, NEW JERSEY, ASSIGNOR TO CARRIER ENGINEERING CORPORATION, OF NEWARK, NEW JERSEY

METHOD AND APPARATUS FOR PRODUCING ARTIFICIAL CLIMATES

Application filed December 27, 1927. Serial No. 242,954.

This invention relates to the production of predetermined, desired climatic conditions, and to a method and apparatus whereby substances may be conditioned or treated under any required climatic conditions. Various localities have peculiar local climatic conditions which materially affect local plant and animal life and articles manufactured there. When plants or animals native to such localities are transferred to other localities having different climatic conditions, such as for the purposes of study or display, the plants and animals have frequently died, or did not flourish because of the changed climatic conditions. The effect of climatic conditions upon the health of human beings is known, some localities being far superior to others for the treatment of certain diseases, but it is impossible for all afflicted persons to visit the localities where natural health restoring climatic conditions would be most beneficial.

In the preparation of various substances for the market, such as macaroni or patent leather, for example, the treatment of the substances in certain localities is a relatively simple matter, and a very high grade and uniform product may always be obtained in those localities. Where the preparation or treatment of such products is attempted in other localities having different climatic conditions, it has been impossible to obtain a uniform or high grade product, even though the same workmen and grade of materials were employed, and the same treatment given as in the first locality.

An object of the invention is to provide an improved method and apparatus for creating and maintaining within an enclosure, climatic conditions which are in necessary essentials identical with or equivalent to the climatic conditions of any selected locality or other desired conditions.

A further object of the invention is to provide an improved method and apparatus for creating and maintaining artificially within an enclosure, atmospheric and light conditions corresponding to those of any selected locality, or desired predetermined condition.

A further object of the invention is to provide an improved method and apparatus by which objects or substances may be subjected to desired gaseous atmospheres having selected or variable characteristics and properties, selected or variable light conditions, and selected barometric conditions.

A further object of the invention is to provide an improved method and apparatus for the treatment or conditioning of commercial products, by which a uniform and high grade product may always be obtained; with which the time of treatment may be materially reduced and with which the apparatus required will be relatively simple, largely automatic, compact and inexpensive.

Various other objects and advantages of the invention will be apparent from the following description of two embodiments of the invention, and the novel features will be particularly pointed out hereinafter in connection with the appended claims.

In the accompanying drawings:—

Fig. 1 is a sectional elevation of an enclosure having associated therewith and illustrated in a more or less diagrammatical manner, apparatus for producing artificially within the enclosure selected climatic conditions, and for conditioning or treating substances in the enclosure under such climatic conditions.

Fig. 2 is a similar view, but illustrating a modification thereof.

In the embodiment of the invention illustrated in Fig. 1, the enclosure 1 is preferably made air tight and may be of any suitable shape, design or construction. If substances are to be treated within the enclosure, they may be arranged or supported in any desired manner in the enclosure, such as upon tables or racks 2, or they may be conveyed through the enclosure in any suitable manner. Sources of ray emanations such as artificial lights 3 of any suitable character and in any desired number may be provided so as to direct emanated rays such as of light in any desired direction within the enclosure. In the particular example illustrated, where substances to be cured are mounted on the racks or frames 2, the sources of light 3 will be arranged to direct their rays upon all the substances being cured or treated. The source of light may be, for instance, lamps of a type giving off chemically active or actinic light rays, such as the ultra-violet or quartz lamps. If desired, suitable ray filters 4 may be interposed between the lamps and the substances to be treated for removing from the light rays those waves which are undesirable in the treatment of those particular substances.

An air or gas removal duct 5 may be connected to a suitable part of the enclosure for communication therewith, and this duct may have two branches 6 and 7 leading to opposite ends of an air conditioning device 8, which may be either a humidifier or a dehumidifier. A blower or other gas or air circulating device 9 is connected by conduit 10 to one end of the air or gas conditioning device 8, so as to draw through the conditioning device, air or gas which has been removed from the enclosure through the duct 5. The air removed through the duct 5 may be passed through the branch 7 and the air conditioning device 8 to the blower, or it may be by-passed around the device 8 and through the branch 6 to the discharge end of the conditioning device 8, which opens directly into the intake side of the blower 9. A suitable damper device 11 is provided in the branch passage or duct 7 for controlling the proportion or amount of the air flow therethrough and through the conditioning device 8, and a suitable damper 12 is provided for the passage 6 so as to control the amount or proportion of air passing through the branch 6 and around the conditioning device 8.

The discharge side of the blower 9 is connected by a duct or conduit 13 to a suitable heater 14 which may be supplied with steam or other heating medium through a pipe or conductor 15 under the control of valve or controller 16. The heater 14 is connected by a conduit 17 to the interior of the enclosure preferably at a point spaced from the opening to removal duct 5, the duct 17 preferably terminating within the inclosure in ejector nozzles 18, so that the air discharged into the enclosure will have considerable velocity and will cause an active circulation of the air in all parts of the enclosure. The blower 9 may be operated in any suitable manner, such as by motor 19 controlled by a rheostat or other controlling device 20 and having a driving connection, such as by a belt 21 to the shaft of the blower.

The air or gas conditioning device 8 may be of any suitable construction adapted to give a required humidity to the air or gas passing through the conditioner, either increasing its humidity or dehumidifying the same, or treating the gas to the action of a liquid, as may be required. The conditioner shown is provided with a suitable spray device 22 by which the air passing through the conditioning device may be subjected to the fine spray of a liquid which is supplied to the spray device 22 by a pipe 23. The spray liquid which is not taken up by the passing gas collects in the bottom of the device 8, is removed by a pipe 24 conducted through a temperature changing device such as a cooler 25, then by a pipe 26 to the intake side of a pump 27 which is connected at its discharge side to the pipe 23. The spray liquid is thus circulated through the conditioning device and is cooled or otherwise modified as to temperature in the cooler or device 25. The cooler 25 may comprise the evaporator of a refrigerating machine including a condenser 28 and a compressor 29, the latter being operated by a motor 30. The refrigerating apparatus may be of any suitable or desired construction.

Fresh air may be admitted to the circulating air through a branch duct or opening 31 leading to the withdrawal conduit 5 and controlled by a suitable damper 32. An air relief duct 33 may also be connected to the interior of the enclosure, and this relief duct may be suitably controlled, as for example, by a pair of controlling dampers 34 and 35 arranged at different points and each completely controlling the passage of the relief duct 33.

The temperature and humidity in the enclosure are regulated as required, by suitable temperature and humidity controlling means. As shown, for this purpose, a thermostat 36 and humidistat 37 are arranged within the enclosure and supplied with a control fluid through a pipe 38 leading from a source of fluid, such as an air tank 39, which in turn is connected to a pump or compressor 40 used to store up air or other fluid under pressure in the tank 39. A pipe 41 leads from the thermostat 36 to the heater controlling valve 16 which is of the diaphragm or fluid pressure-operated type, so that the valve 16 will be operated in accordance with the setting of the thermostat 36 by the fluid admitted to the pipe 41 under the control of the thermostat. Thus, the temperature in the enclosure will be automatically controlled by the thermostat 36 which controls the extent to which the air that is withdrawn, conditioned and returned will be heated by the heater 14 prior to its return.

The humidistat 37 is connected by a pipe 42 to a diaphragm-operated valve 43 provided in the spray liquid pipe 26 leading to the intake side of the pump 27, so that the amount of liquid supplied to the spray nozzles 22 of the conditioning device 8 will be varied automatically under the control of the humidistat which effects this control through the medium of compressed air or fluid conducted by the pipe 42 to the control valve 43. Another pipe 44 leads from the humidistat 37 to a suitable air motor 45 connected to an operating arm 46 of a rheostat or other current controlling device 47. The device 47 is connected by conductors 48 to the lamps 3 and is supplied with current by suitable power mains 49. Thus, the illumination intensity of the lights for the enclosure will be controlled automatically from the humidistat by a variation in the amount of current admitted to the lamps, the control being automatic so that the intensity of the light within the enclosure will be automatically varied in accordance with changes in the relative humidity within the enclosure.

A branch pipe 50 may connect the pipe 44 to another air motor 51 which by suitable connections operates the dampers in the air circulating system. For example, the dampers 11 and 12 may have operating arms connected by links 53 and 53a to the operating arm 52 of the motor 51, and one of these dampers, such as 11, may in turn be connected by a link 54 to the dampers 32 and 34, so that the dampers 11, 12, 32 and 34 will all be operated proportionately and in a desired relation to one another upon any change in one of them. All of the dampers will be operated in this manner automatically by the motor 51, which in turn is controlled by the humidistat. The damper 35 is separately and preferably manually operated, but it will be understood that any or all of the dampers 11, 12, 32 and 34 may also be operated manually or under separate control, as desired.

In order to produce a rarefied atmosphere within the enclosure, the air delivery duct or conduit 17 may be provided with a branch 55 connected to the intake side of a small blower or exhauster 56 which is operated by a motor 57 under the control of a rheostat or other controlling device 58, the current being supplied thereto by suitable mains 59. The rheostate or controlling device 58 is in turn controlled by an electric circuit including wires 60 leading from the device 58 to a regulator 61 of any suitable construction arranged within the enclosure 1. The regulator 61 is responsive to changes in barometric pressure and varies the current passing through the controlling circuit including the wires 60, in accordance with changes in barometric pressure within the enclosure. If the regulator 61 is set to maintain a certain barometric pressure, any increase in the pressure within the enclosure above such set pressure will cause an operation of the control device 58 and start operation of the exhauster 56. The exhauster 56 withdraws from the air being delivered to the chamber of quantity sufficient to create and maintain the desired rarefied condition of the atmosphere within the enclosure.

Provision should also be made for shutting off the branch 55 leading to the small exhauster 56. For example, a suitable control damper 62 may be provided in the branch 55, which damper 62 may be manually or otherwise operated to shut off the branch 55 when the device is set to produce within the enclosure an atmospheric pressure greater than without the enclosure, that is, when the use of the small exhauster 56 is not desired. The branch 55 may also have therein a self-closing, one way valve 63 which opens toward the exhauster to permit air flow thereto but which closes automatically when the operation of the exhauster 56 is stopped, so as to prevent entrance into the conduit 17 of air from outside the enclosure through the branch 55.

Under some conditions it may be desirable to admit to the spray liquid, suitable liquids which are to be used in treating the air or gas passing through the conditioning device 8 and delivered into the enclosure, and accordingly the supply pipe 23 of the spray device may be connected to the outlet side of a pump 64 which is connected by a pipe 65 to sources of various liquids whose use may be desired. For example, the pipe 65 may have a plurality of valve-controlled branches 66, 67, 68, 69 and 70, which lead to sources of different liquids. By way of illustrative example, pipes may lead respectively to sources of sulphuric acid, nitric acid, hydrochloric acid, sodium hydroxide and potassium hydroxide. These liquids are mentioned merely by way of example, and are not in any sense limiting, since any liquids whatever may be utilized. Suitable valves 71 and 72 may be provided in the branches of the pipes 23 leading to the pumps 27 and 64 so that the liquid from the pumps may be used independently of each other or together.

In some instances it may be desirable or necessary to admit certain gases to the enclosure, and while the admission may be accomplished in any desired manner, the intake side of the blower 9 which circulates the air or gaseous atmosphere of the enclosure may have connected thereto another conduit 73 having two branches 74 and 75 which are controlled by dampers 76 and 77 respectively. One of these branches, such as 74, may in turn be connected to a plurality of pipes 78 leading to sources of different gases such as nitrogen, hydrogen, oxygen, sulphur dioxide, carbon dioxide, ammonia and ozone, or any other gaseous substances which one might desire to introduce into the enclosure. Each pipe 78 is, of course, separately controlled.

In the embodiment of the invention illustrated in Fig. 2, the apparatus is similar to that shown in Fig. 1, except for the manner in which the light is controlled, and similar parts are designated by the same reference numerals. Instead of using artificial lights, as in Fig. 1, direct sunlight may be utilized, and for this purpose, a wall or roof of the enclosure made with one or more openings, may be closed by a light transmitting panel or wall. Such a panel or wall may be formed of ordinary glass in some instances, but preferably is formed of a material which will transmit the actinic rays of sunlight, such as the ultra-violet rays or other rays having short wave lengths. For example, a material known as cellophane, quartz and certain kinds of glass, which have the property of transmitting the ultra-violet or actinic rays of light, may be utilized.

Suitable shutters 80 may be provided for shutting off the light to variable extents, and these shutters 80 are connected together for concomitant operation, such as by an air motor 81. A pipe 82 connecting the motor to an air supply tank 39 furnishes air to the motor 81 for operating it, and may have included therein a control valve 83 which is operated or controlled magnetically by a solenoid 84. The solenoid in turn is controlled by a circuit including wires 85 leading into the enclosure and connected through a relay 86 and batteries 87 to a photocell or light sensitive device 88. The photocell may be of any suitable sort, such as a selenium, or other light-sensitive cell, the resistance of which varies with variations in the intensity of the light rays falling thereon. Thus, the light-sensitive or photocell device 88 which is disposed within the enclosure in the path of the light entering through the light transmitting panel 79 will control the shutters 80 so as to maintain as far as possible the required selected intensity of light within the enclosure.

In some instances it may be desirable to interpose ray filters (not shown) in the path of the light rays entering the enclosure so as to remove from the entering light emanations or rays of an undesirable character. It is also desirable in some instances to subject the interior of the enclosure to light rays within a certain band or wave lengths with all others excluded, and for this purpose sunlight or other light may be collected through a suitable optical collector 89 and directed upon a light grating 90 which breaks up the light rays into bands of different wave lengths, that is, it breaks up the light into their primary colors. The grating 90 may be flat, convex or concave, as may be desired, and may be pivotally mounted upon a suitable frame 91, so as to direct any particular band of primary colors into any part of the enclosure. The drawing illustrates a convex grating for the purpose of diffusing or spreading the primary colors, and collimators 92 may be interposed in the path of the light rays of any band of primary colors leaving the grating 90, so as to collimate them and direct them into the enclosure. If desired, suitable opaque screens or filters (not shown) may be interposed in the path of the light rays of the other primary colors leaving the grating 90, to prevent their entrance into the enclosure.

In the use of apparatus such as illustrated, the air or gaseous atmosphere of the enclosure is withdrawn through the duct 5 and any desired portion conditioned in the device 8 or bypassed around it, the blower forcing this withdrawn and treated or untreated air or gaseous atmosphere through the heater 14 and back into the enclosure at considerable velocity. Where fresh air is desired, the damper 32 may be connected to the dampers 11 and 12 for operation therewith, and the opening of this damper 32 will admit fresh air to the air withdrawn through the duct. The damper 77, instead of damper 32 may be operated to admit fresh air directly to the intake side of the blower. Any desired gases may be admitted to the circulating atmosphere through the pipes 78, the damper 76 being open at such times. Where fresh air or other gases are admitted to the circulating atmosphere, the relief duct 33 may be opened by opening the damper 35, and the damper 34 may be so connected to the damper 32 that when the latter is opened to admit fresh air, the damper 34 will be opened to permit the escape from the enclosure of a corresponding amount of old air.

If an increase in atmospheric pressure within the enclosure is desired, the damper 35 may be closed and fresh air or gas admitted with the result that the atmospheric pressure in the enclosure will be built up, the damper 62 in the branch exhaust outlet being, of course, closed at this time. If a rarefied atmosphere is desired, the damper 62 is opened, and the damper 35 closed, and the regulator 61 set to the desired barometric pressure. Exhauster 56 will then operate to withdraw a quantity of the circulating air sufficient to create the desired rarefication within the enclosure, and when this desired atmospheric pressure or rarefication is reached, the exhauster 56 is shut down temporarily, the one-way valve 63 will prevent an inrush of air which which would otherwise break or destroy this rarefication.

The intensity of the lights is regulated automatically from the humidistat, which may be set to control the relative humidity and maintain it at a desired value, the intensity of the lights being varied automatically with changes in the relative humidity. The spray is also controlled automatically from the humidistat so as to maintain the relative humidity at the desired value, and when one desires to treat the gaseous atmosphere with any particular liquids, these liquids may be added to or substituted for the usual spray liquid.

In the embodiment of the invention illustrated in Fig. 2, the light entering the enclosure and reaching the light sensitive cell or device 88 will produce changes in the circuit including wires 85, in a manner to cause an operation of the shutter to admit the desired intensity of light. Opaque screens, ray filters and collimators may be used, if necessary, in order to produce any necessary or desired light condition within the enclosure.

The applications to which such apparatus may be put are varied and numerous. As one example, such apparatus is particularly valuable in the curing of macaroni. The highest grade of macaroni is now made in Naples where the local climate is peculiar to that locality and not exactly duplicated in any known part of the earth's surface. Even with the same experienced men and the same source of raw materials, it has been impossible heretofore to make the same grade of macaroni in any other part of the world due apparently to the inability to find a locality having the peculiar climatic condition of Naples. With this improved method and apparatus, all the material climatic conditions of Naples may be artificially produced and maintained, and therefore, macaroni of the same grade as that made in Naples may be easily and uniformly obtained in any other locality.

The apparatus is also applicable to the production of patent leather. The usual method of curing patent leather, or rather varnished hides, consists in exposing the materials to direct daylight for a period of approximately eight hours, in order that the linseed oil and other ingredients composing the enamel on the leather may have an opportunity to polymerize and oxidize. This action on the oil and ingredients is caused by the action of the chemically active rays of sunlight, which in this case are the ultra-violet rays and some immediately adjacent rays. With both forms of the illustrated apparatus, the ultra-violet or actine light may be easily obtained for treating the uncured leather, and the time necessary for the curing operation can be cut down from eight hours to approximately one or two hours. The action of the ultra-violet light is retarded by a moist atmosphere, because the moist air is a ready absorbant for ultra-violet light, and therefore sunlight on a humid day is not as efficient for curing purpose as it is on a dry day. The effectiveness of ultra-violet and other chemically active rays of the spectrum is increased by a cool atmosphere. With apparatus of the type illustrated, the dry, cool atmosphere and exposure to the chemically active rays of the spectrum may be uniformly obtained, and therefore patent leather may be cured in a minimum of time which is very much less than that required for the natural process, and a uniformly high grade product may always be obtained and in any locality.

Apparatus produced and used in accordance with this invention may be utilized to house plants or animals which are removed for various purposes, such as for study or demonstration, to other localities where the climatic conditions are very different from those of the natural habitat of the plants or animals. With this apparatus, the climatic conditions under which the plants and animals thrive may be easily and independently produced in any locality, and these conditions may be varied, as necessary. By being able to vary the conditions gradually or abruptly, seasonal or other climatic changes within the enclosure can be artificially obtained at will, and the effect of various climatic changes upon plants and animals easily studied and observed.

By equipping rooms or buildings with climate-producing apparatus in accordance with this invention, various climatic conditions, which are most beneficial in the treatment of various diseases may be easily produced, so that patients may, without long journeys and at a minimum of expense, be able to spend more or less time in an enclosure having the climatic conditions most favorable for the treatment of any particular diseases, and the effect of various climatic conditions and changes upon various diseases may be easily studied.

By the term "atmosphere" as used in the specification and claims, I do not refer solely to the usual composition of the natural atmosphere, but rather to a gaseous condition having a single gas or a mixture of various gases which may or may not all be found in any particular natural climate, since, according to the broader aspect of the invention, the intention is to provide a gaseous envelope of any desired characteristics and composition that may be useful in accomplishing desired results. The spray may chemically, physically, or both, affect the portions of the gaseous envelope which are treated in the conditioning device. By the term "climate" I do not refer soley to actual climatic conditions which are necessarily found in some locality in nature, but in its broader aspects, the invention also comprehends the treatment or subjection of any substances or animate or inanimate objects, to any selected or desired gaseous envelope, and to the action of ray emanations of any desired character. In the uses of the invention herein mentioned, such conditions may correspond more or less closely to selected natural climatic conditions, some departures being made in some instances from natural climatic conditions, so as to obtain particular desired conditions.

Various other applications of the invention will suggest themselves to those skilled in the art, and the above examples are to be considered as illustrating only a very small part of the wide uses to which the invention may be put, and are not to be in any sense considered as limiting the scope of the invention.

It will be further understood that various changes in the details, which have been herein described and illustrated in order to explain the nature of the invention, may be made by those skilled in the art within the principle and scope of the invention as expressed in the appended claims.

Claims:—

1. A process for conditioning substances independently of local climatic conditions which comprises enclosing said substances, subjecting said enclosed substances to gas conditioned as to temperature and relative humidity, subjecting said substance to light rays, and varying the intensity of the light rays with variations in relative humidity of said gas.

2. A method of artificially producing in an enclosure, desired climatic conditions which comprises selectively and artificially conditioning a gas as to humidity and temperature to provide within the enclosure a gaseous atmosphere having the humidity and temperature desired, artificially producing and providing in the interior of the enclosure selected light rays having actinic characteristics the same as, or equivalent to, the desired light conditions, and selectively varying the intensity of the light rays with variations in the humidity of the conditioned atmosphere within the enclosure.

3. Apparatus for artificially producing within an enclosure, desired climatic conditions, which comprises said enclosure, means for artificially and selectively conditioning the atmosphere of said enclosure as to humidity and temperature, means for artificially producing and providing in the interior of said enclosure selected light rays having the characteristics of the desired light rays, and means for varying the intensity of said light rays to permit variations of said rays with variations in humidity of the atmosphere within said enclosure.

4. Apparatus for artificially producing within an enclosure, desired climatic conditions, which comprises said enclosure, means for artificially and selectively conditioning the atmosphere of said enclosure as to humidity and temperature, means for artificially producing and providing in the interior of said enclosure selected light rays having the characteristics of the desired light rays, and means responsive to humidity conditions within said enclosure for varying the intensity of said rays automatically with variations in the atmospheric humidity within said enclosure.

5. A method of artificially producing in an enclosure desired climatic conditions, which comprises selectively conditioning the gaseous atmosphere of an enclosure to have the humidity and temperature desired, supplying to the interior of the enclosure selected emanations having actinic characteristics of a climate desired, and selectively varying the intensity of the emanations with variations in the humidity of the conditioned atmosphere within the enclosure.

JOSEPH M. LE GRAND.